United States Patent
Krishnan

(10) Patent No.: US 6,356,631 B1
(45) Date of Patent: Mar. 12, 2002

(54) MULTI-CLIENT OBJECT-ORIENTED INTERFACE LAYER

(75) Inventor: Shankarnarayan Krishnan, San Gabriel, CA (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/160,624

(22) Filed: Sep. 24, 1998

(51) Int. Cl.[7] .............................................. H04M 3/42
(52) U.S. Cl. .......................... 379/201.01; 379/201.03; 379/211.02; 379/219
(58) Field of Search ................................. 379/201, 211, 379/219, 220, 221, 229, 230, 265, 266, 309

(56) References Cited

U.S. PATENT DOCUMENTS

| | | | |
|---|---|---|---|
| 5,241,588 A | * 8/1993 | Babson, III et al. | 379/201 |
| 5,384,771 A | 1/1995 | Isidoro et al. | 370/58.2 |
| 5,455,854 A | 10/1995 | Dilts et al. | 379/201 |
| 5,608,789 A | * 3/1997 | Fisher et al. | 379/201 |
| 5,737,393 A | 4/1998 | Wolf | 379/67 |
| 5,790,800 A | 8/1998 | Gauvin et al. | 395/200.57 |
| 5,999,609 A | * 12/1999 | Nishimura | 379/201 |

FOREIGN PATENT DOCUMENTS

WO        WO 98/06207        2/1998

* cited by examiner

Primary Examiner—Ahmad Matar
Assistant Examiner—William J. Deane, Jr.
(74) Attorney, Agent, or Firm—Jenkens & Gilchrist, A Professional Corporation

(57) ABSTRACT

The present invention is directed to a system, method, and apparatus for adding the benefit of object-oriented programming to conforming application programs to the specifications of telephony software interfaces and reducing the traffic load from messages generated and sent by line devices to application programs. An object-oriented interface layer is inserted between the application program which accepts objects from the application programs and causes the telephony software interface to perform a standard set of operations. From the standpoint of the telephony software interface, the object-oriented interface layer is the application program utilizing the line devices, thus causing the line devices to generate a single message to the object-oriented interface layer which distributes the message to the appropriate application programs. Accordingly, the traffic load caused by the generation of messages is reduced.

11 Claims, 4 Drawing Sheets

MULTI-CLIENT OBJECT-ORIENTED INTERFACE LAYER

BACKGROUND OF THE INVENTION

1. Technical Field of the Invention

The present invention is related to telephony software interface, and more particularly, to adding the benefit of object-oriented programming and distributed computing to the telephony software interface.

2. Description of Related Art

Advances in computers systems have greatly simplified the task of information processing. Computer systems can typically store large amounts of information in a relatively small area of physical space and permit the information stored to be easily accessed and modified. Computer systems also allow large amounts of information to be processed both quickly and accurately.

Computer systems are sometimes operated as stand-alone devices or connected together by way of network connections, typically together with a server, to form a computer network. When networked together, the resources of each computer can be used together to perform an information processing function. The foregoing is known as distributed computing. A server is a class of computers used to handle file, print, and certain application services which are common to all the connected computers, known as clients. A common use of the server also includes handling and maintaining telephony equipment for use by the clients. Handling and maintaining the telephony equipment at the server is advantageous because the same telephony equipment can be used by any of the clients which can be sparsely located about a geographic area.

Communication of information is one of the most popular uses of computers today. Computers connected across a communication channel or medium are able to transfer large amounts of data electronically. The data is generated by and used within application programs which cause computers to perform useful functions such as word processing, browsing web pages, accessing databases, etc.

There are several communication media that are available to users. One of the most common communications mediums for communication between computers is the telephonic infrastructure. The telephonic infrastructure includes, but is not limited to, the public switched telephone network (PSTN), a private branch exchange (PBX), integrated services digital network (ISDN), and what is known as a T1/E1 line. The foregoing are known in the art as line devices. A user can connect their computer to a line device, and then place a phone call to another computer similarly connected to the telephonic infrastructure. In the networking context, the user at a client can use a line device maintained by a server for communication.

In order for data from application program to be transmitted using a particular line device, model-specific technical details of the particular line device must be known. The model-specific details of the line device can be hardcoded into the application program. However, because the application program is usually sold separately from the line device, the application program could potentially use any of several hundred different line device models. Therefore, programs specific to each potential line device would have to be included in the application program.

An alternative approach is to abstract the model-specific technical details from the application program. A telephony software interface provides a standard interface to any number of application programs, wherein the application programs communicate a standardized set of commands through the interface to telephony software interface. Telephony software receives commands through the telephony software interface and uses a set of files containing the model-specific technical details to effectuate the requests of the application program. Because the model-specific technical details files are separated from the application program, the files can be provided with the line device. Therefore, only the model-specific technical details for the line devices used are installed in the computer. A key advantage to telephone software interfaces are that the application program and the telephony software can be executed on different computers. Therefore, the telephony software at a server can be used to effectuate commands from an application program executed by a client.

A very commonly used telephony software interface is the Telephony Application Programming Interface (TAPI) developed by the Microsoft Corporation and the Intel Corporation. Another example of telephony software interface is the Telephony Services Application Programming Interface (TSAPI) developed by the Novell Corporation. In order for an application program to use a telephony software interface, the application program must conform to certain specifications of the telephony software interface. Conforming to the specifications of a telephony software interface is a cumbersome and tedious process where the telephony software interface is not object-oriented. Object-oriented programming is a form of software development that models the real world through representation of objects or modules that contain data as well as instructions that work upon that data. The objects encapsulate the attributes, relationships, and methods of software-identifiable program components simplifying complex programs.

Additionally, in a networking context where the telephony software interface serves a number of application programs. As each application program conducts operations on the various line devices, the line devices send messages to the application programs. In many cases, several application programs simultaneously perform operation on a single line device. Where the line device requires communication to the application programs, a separate message is sent to each application program. Sending a separate message to each application program results in excess traffic within the telephony software interface.

Accordingly, it would be beneficial if a way of adding object orientation to the telephony software interface as well reducing traffic generated from the messages could be devised.

SUMMARY OF THE INVENTION

The present invention is directed to a system, method, and apparatus for transmitting information from an application program on a line device by receiving an object from said application program at an object-oriented interface layer causing a telephony software interface to perform an operation corresponding to the object, receiving a message from the line device at the object-oriented interface layer, forwarding the message to the application program.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF PREFERRED EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
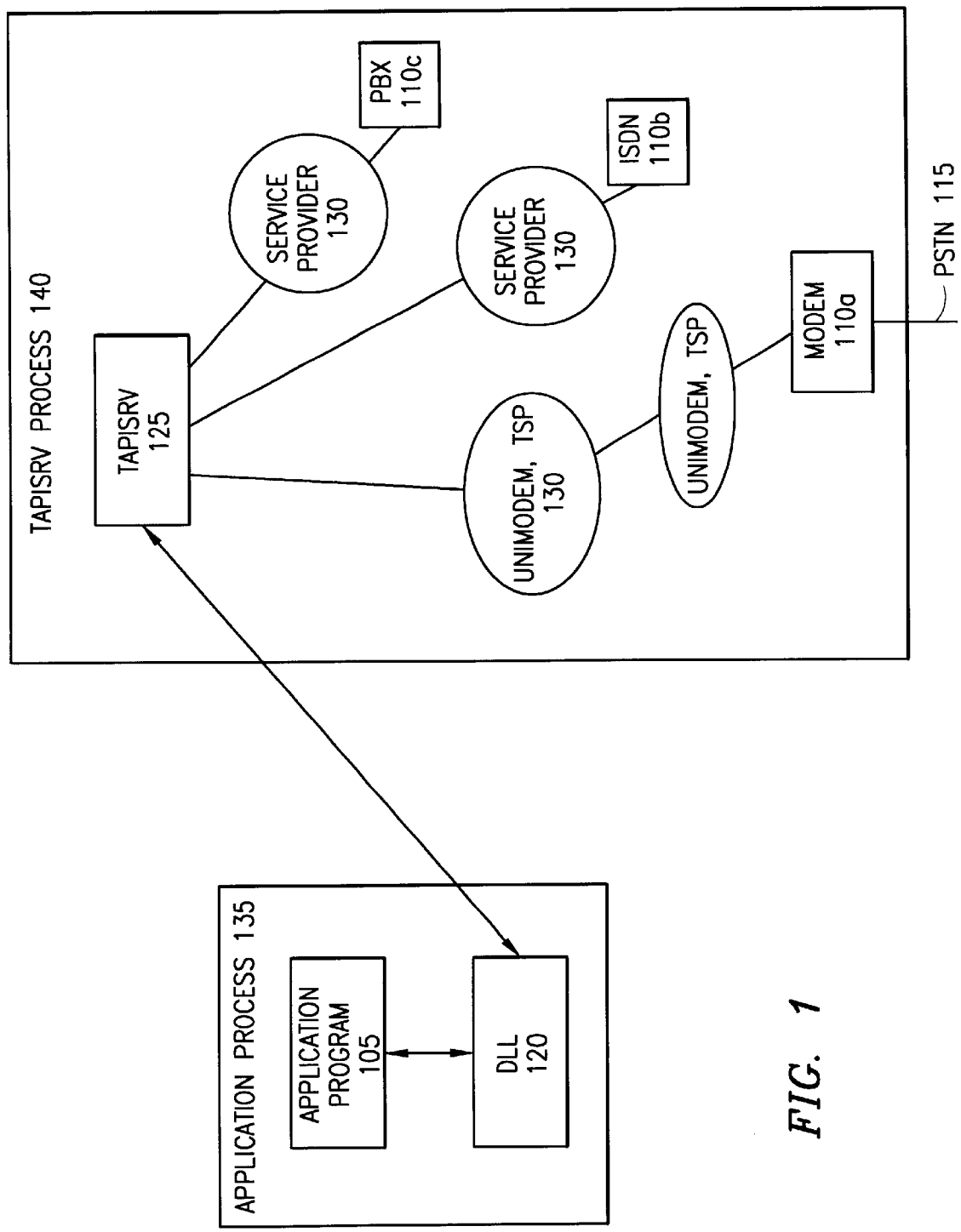
FIG. 1 is a block diagram of the Telephony Application Programming Interface architecture.

Referring now to FIG. 1, a block diagram of the Telephony Application Programming Interface (TAPI) architecture is described. TAPI is a telephony software interface which provides a standard interface through which application programs 105 can access, transmit information on, and receive information from telephony hardware 110, known as line devices. Another example of a telephony software interface includes Telephony Services Application Programming Interface (TSAPI). The application program 105 can be, for example, a word processor, a Web Browser, or a Chat Program. The telephony hardware 110 can include, for example, a modem connected to a PSTN line 115, an ISDN line 110b, or a private branch exchange (PBX) 110c.

In order for information from application program 105 to be transmitted using a particular line device 110, model-specific technical details of the particular line device must be known. The model-specific details of the line device 110 can be hardcoded into the application program 105. However, because the application program 105 is usually sold separately from the line device 110, the application program 105 could potentially use any of several hundred different line device models. Therefore, programs specific to each potential line device 110 would have to be included in the application program 105.

An alternative approach is to abstract the model-specific technical details from the application program 105. The TAPI architecture, as well as the TSAPI architecture, provide an interface to the line devices 110 which abstract the model-specific details of the line device from the application program 105. The TAPI architecture includes a telephony software interface dynamic link library (DLL) 120, an executable program, TAPISRV 125, and one or more service providers 130. The DLL 120 can comprise, for example, the dynamic link library known as "tapi.dll" or the dynamic link library known as "tapi32.dll." The DLL 120 receives function requests from the application program 105 for the line device 110, and transfers the function requests to TAPISRV 125 using the lightweight remote procedure call (LRPC).

TAPISRV 125 is a telephony software interface executable program that provides the sequence of operations that exposes the line devices 110 to application programs 105 through a TAPI protocol and causes the line devices 110 to perform specific functions. The required model-specific technical details of the line device 110 are stored in the service provider 130 for the line device 110. The service provider 130 is a file written by the manufacturers of the line device 110 which is installed with the line device 110.

The foregoing is advantageous because the application program 105 need not be aware of any of the specific details of the line device 110. Another advantage is that the application program 105 and the DLL 120 constitute a different process from TAPISRV 125. The process including the application program 105 and the DLL 120 are referred to as the application process 135, while the process including TAPISRV 125 is referred to as the TAPISRV process 140. The separation of the processes 135, 140 is advantageous in a computer network where the processes may be performed on different computers.

Figure 2:
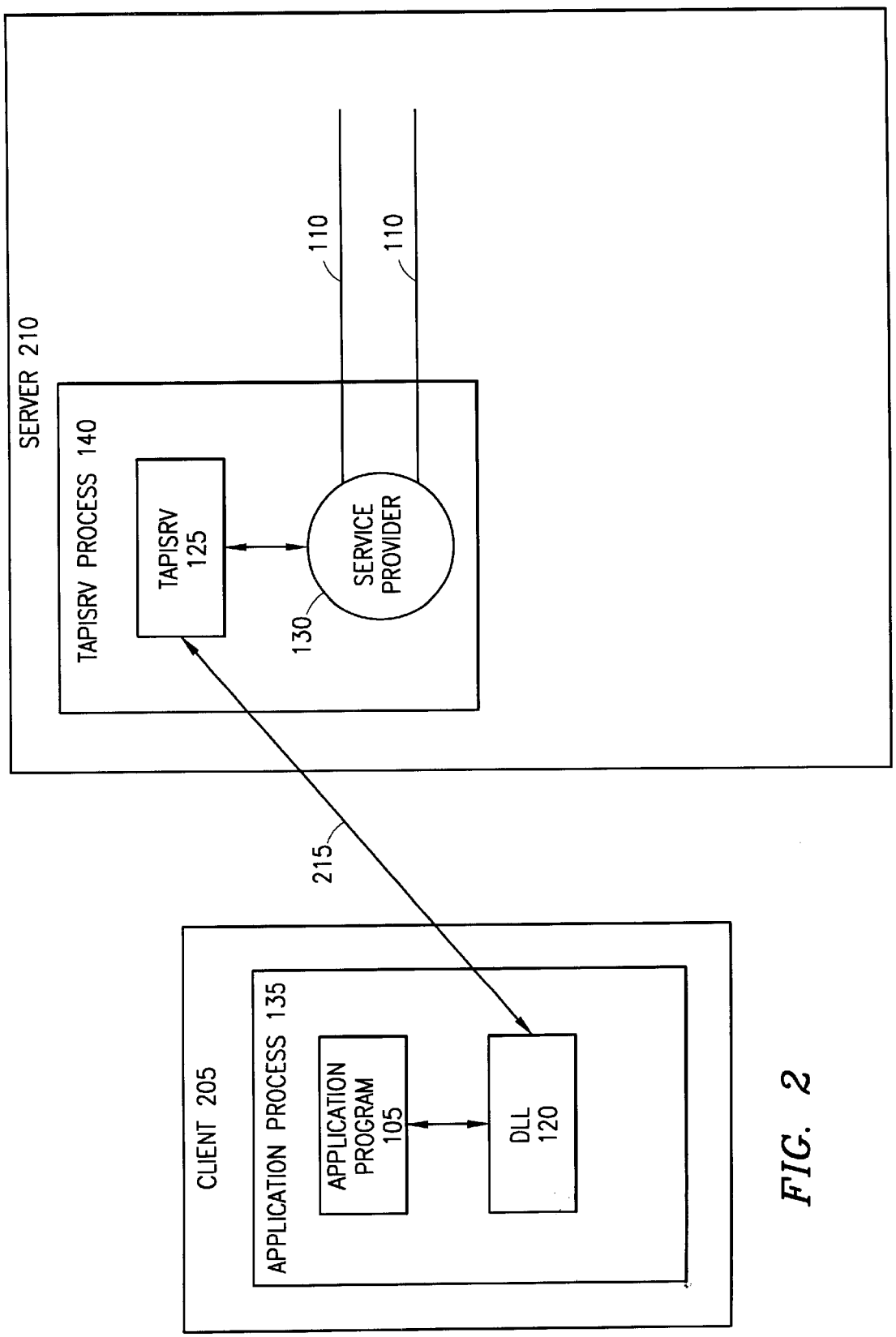
FIG. 2 is an exemplary client/server environment for practicing the present invention.

Referring now to FIG. 2, an exemplary client/server environment for practicing the present invention is described. The application process 135 is executed by a client 205 and a TAPISRV process 140 executed on a server 210. The DLL 120 and TAPISRV 125 communicate over a client/server connection 215 which may comprise an in-band or an out-of-band connection.

In order for an application program 105 to use the DLL 120, the application program must conform to certain specifications of the DLL 120 and TAPISRV 125. Conforming to the specifications of the DLL 120 and TAPISRV 125 is a cumbersome and tedious process because neither are object-oriented. Object-oriented programming is a form of software development that models the real world through representation of objects or modules that contain data as well as instructions that work upon that data. The objects encapsulate the attributes, relationships, and methods of software-identifiable program components, simplifying complex programs.

Additionally, where the DLL 120 and TAPISRV 125 serve a number of application programs 105, more than one application program 105 may conduct operations on a line device 110. Responsive to certain events, the line device 110 send messages to the application programs 105. Where the line device 110 requires communication to the application programs 105, a separate message is generated and sent to each application program performing operations on the line device 110. Generating and sending a separate message to each application program 105 results in excess traffic within the telephony software interface.

Figure 3:
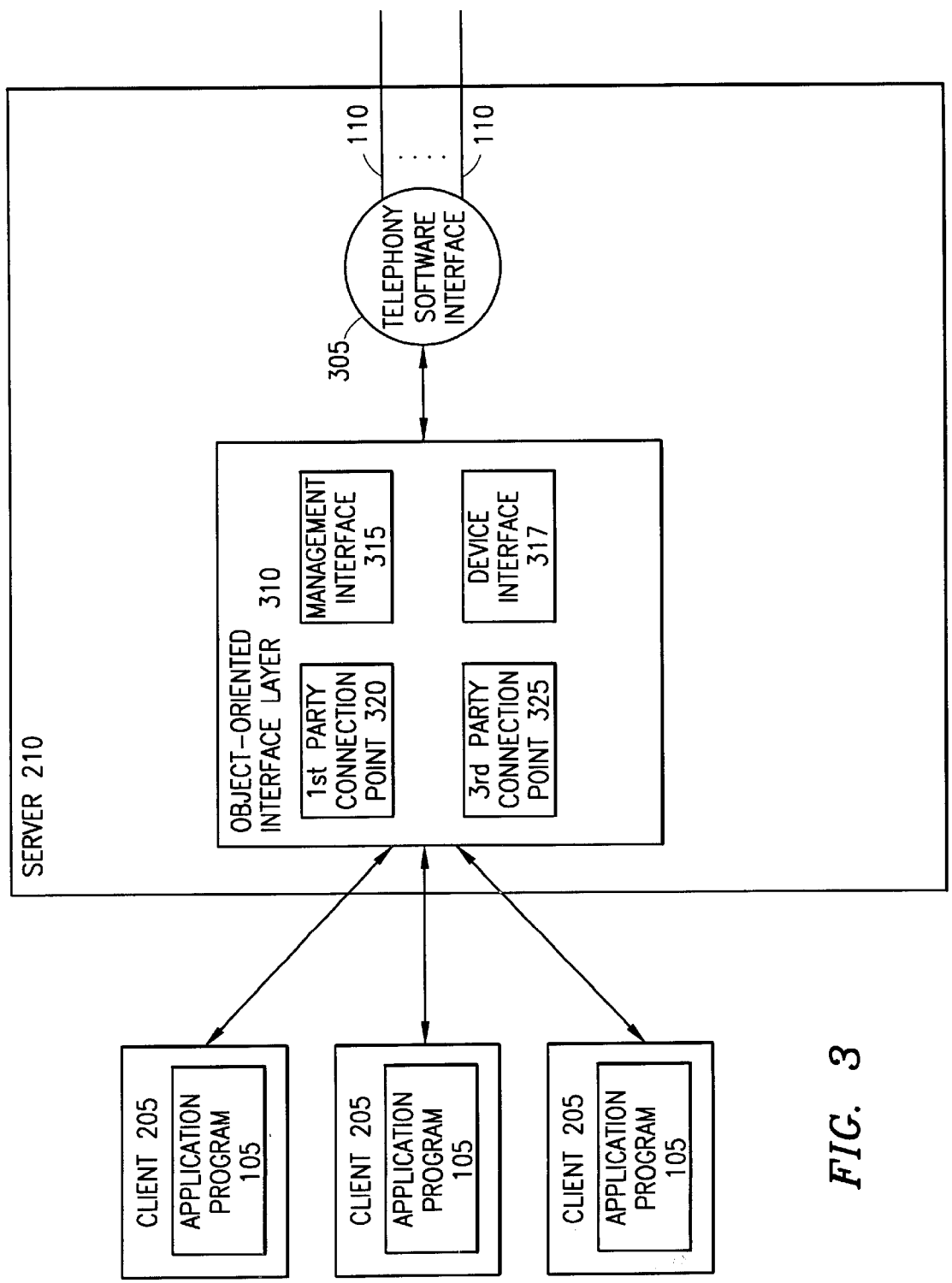
FIG. 3 is an exemplary software architecture embodying the present invention.

The cumbersome and tedious task of conforming the application program 105 to conform to the specifications of the DLL 120 and TAPISRV 125, as well as the traffic resulting from message routing are alleviated using a object-oriented interface layer. Referring now to FIG. 3, an exemplary software architecture embodying the present invention is described. A server 210 maintains any number of line devices 110 available for use by application programs 105 executed by clients 205. A telephony software interface 305 provides a standard interface through which application programs 105 can access, transmit information on, and receive information from the available line devices 110. The telephony software interface can comprise, for example, TAPI which includes the DLL 120, TAPISRV 125, and necessary service providers 130, or TSAPI. An object-oriented interface layer 310 is inserted between the telephony software interface 305 and each application program 105. The object-oriented interface layer 310 is an interface which establishes a session with the telephony software interface 305. During the session, the object-oriented interface layer 310 accepts objects from the application programs 105 and causes the telephony software interface 305 to perform a number of operations such as "Make Call", "Drop Call", "Hold", and "Transfer". In one embodiment, the object-oriented interface layer 310 can comprise what is known as a Distributed Component Object Module (DCOM). Accordingly, the cumbersome task of conforming the application programs 105 to the specification of the telephony software interface is abstracted within the object-oriented interface layer 310.

The utility of the object-oriented interface layer 310 is optimized by placing the object-oriented interface layer at the server. By placing the object-oriented interface layer 310 at the server 210, the object-oriented interface layer can be used by each of the application programs 105 on the various clients 205. To accommodate multiple application programs 105, the object-oriented interface layer 310 includes a management interface 315 which allows the application programs to register and unregister with the object-oriented interface layer 310. The management interface 315 also permits application programs 105 to open and close the line devices 110 controlled by the Telephony Software Interface 305. The support for the operations by the telephony software interface 305 in the object-oriented interface layer 310 is separated from the management interface 315 and maintained in a Device Interface 317. The management functions and the telephony software interface operation support are separated to further the object-oriented. functionality of the object-oriented interface layer 310.

From the standpoint of the Telephony Software Interface 305, the object-oriented interface layer 310 is the program utilizing line devices 110, even though application programs 105 are the programs which provide the information and data transmitted on the line devices. Accordingly, when a line device 110 needs to communicate information to the application program utilizing the line device, a single message is generated and directed towards the object-oriented interface layer 310. Because the messages contain useful information for the application programs 105 utilizing the sending line device 110, the object-oriented interface layer 310 must distribute the message to the appropriate application programs.

To distribute the messages generated by the line devices 110 to the appropriate application programs 105, the object-oriented interface layer includes a First Party Connection Point 320 and a Third Party Connection Point 325. The First Party Connection Point 320 is an interface for receiving messages for application programs 105 which generally involve individual line devices 110, known as first party applications. A message from a line device 110 that needs to be distributed to a first party application is routed to the First Party Connection Point 320 which forwards the message to the appropriate application program 105. The Third Party Connection Point 325 is an interface for receiving messages for application programs 105 which generally have global, system level perspective and involve most, if not all of the line devices 110, known as third party applications. Because third party applications have a global, system level perspective, messages from most, if not all of the line device 110 are relevant to the proper operation of the third party application. Accordingly, any message received by the object-oriented interface layer 310 from a line device 110 is routed to the Third Party Connection Point 325. The Third Party Connection Point 325 then broadcasts the message to every third party application.

It is noted that the interfaces for distributing messages to the application programs 105 are not limited to the First Party Connection Point 320 and the Third Party Connection Point 320. In fact, the object-oriented interface layer 310 is versatile such that other customized interfaces are easily incorporated by those skilled in the art.

Figure 4:
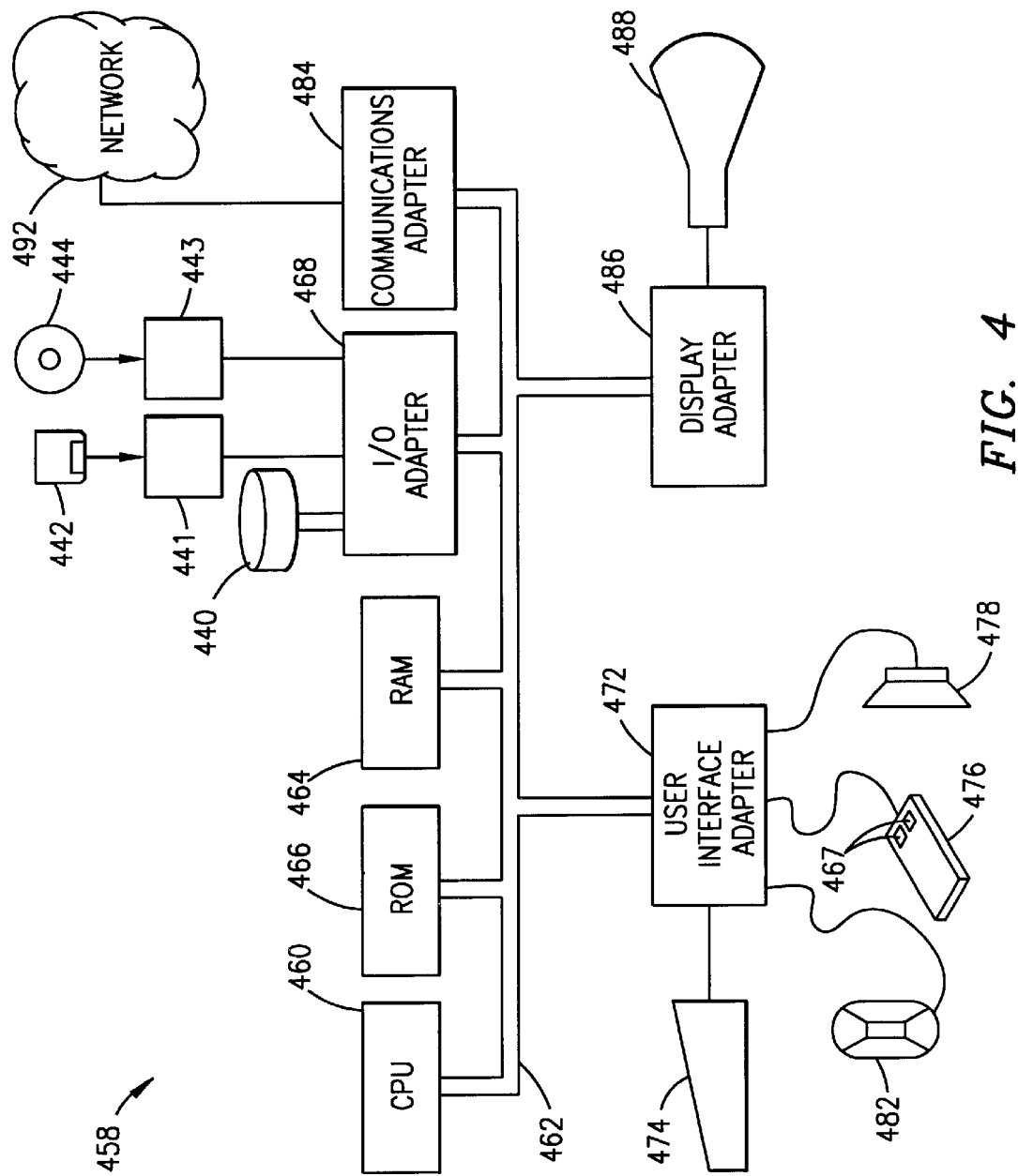
FIG. 4 is representative hardware environment for practicing the present invention.

Referring now to FIG. 4, there is shown a representative hardware environment for a computer system 458, such as client 205 or server 210 for practicing the present invention. A CPU 460 is interconnected via system bus 462 to random access memory (RAM) 464, read only memory (ROM) 466, an input/output (I/O) adapter 468, a user interface adapter 472, communications adapters 484, and a display adapter 486. The input/output (I/O) adapter 468 connects peripheral devices such as hard disc drives 440, floppy disc drives 441 for reading removable floppy discs 442, and optical disc drives 443 for reading removable optical disc 444 (such as a compact disc or a digital versatile disc) to the bus 462. The user interface adapter 472 connects devices such as a keyboard 474, a mouse 476 having a plurality of buttons 467, a speaker 478, a microphone 482, and/or other user interfaces devices such as a touch screen device (not shown) to the bus 462. The display adapter 486 connects a monitor 488 to the bus 462. The communications adapters 484 connect the computer system to a data processing network 492. The data processing network 492 may include any number of other computer systems, such as another computer system 458 or a server, as well as mass storage elements such as another hard disc drive 440, or another optical disc drive 443 for reading optical discs 444.

The object-oriented interface layer 310 can be implemented as sets of instructions resident in the random access memory 464 of one or more computer systems 458 configured generally as described in FIG. 4. Until required by the computer system 458, the set of instructions may be stored in another computer readable memory, for example in a hard disc drive 440, or in removable memory such as an optical disc drive 444 for eventual use in an optical disc drive 443, or a floppy disc 442 for eventual use in a floppy disc drive 441.

Although the invention has been described with a certain degree of particularity, it should be recognized that elements thereof may be altered by persons skilled in the art without departing from the spirit and scope of the invention. For example, although the invention is described with a particular emphasis on TAPI, the invention can be practiced using any telephonic software interface. Therefore, the invention is limited only by the following claims and their equivalents.

What is claimed is:

1. A method comprising the steps of:

abstracting model specific details of at least one line device from at least one application program at a dynamic link library included within an object-oriented interface;

receiving an application object from said at least one application program at said object-oriented interface layer;

converting said application object to an executable operation using said dynamic link library;

forwarding said executable operation from said object-oriented interface to said telephony software interface; and performing said executable operation by said telephony software interface using said at least one line device, wherein said performing step further comprises the step of performing a function by a line device in response to said executable operation.

2. The method of claim 1, further comprising the steps of:

registering with said object-oriented interface layer as a first or third party application program by said at least one application program; and unregistering with said object-oriented interface layer as a first or third party application program by said at least one application program.

3. The method of claim 1, further comprising the steps of:

opening at least one line device by said at least one application program; and closing at least one line device by said at least one application program.

4. A system for transmitting information from a first computer to a second computer, said system comprising:

at least one application program for generating said information;

at least one line device for transmitting said information from said first computer to said second computer, and for generating a message including useful information in an application independent format for at least one application program;

an object-oriented interface layer for receiving an application object from one of said at least one application programs and forwarding said executable operation from said object-oriented interface to said telephony software interface, said object-oriented interface further comprising a dynamic link library for abstracting model specific details of at least one line device from at least one application program, and converting said application object to an executable operation; and a telephony software interface for performing said executable operation using said at least one line device.

5. The system of claim 4, wherein said object-oriented interface layer forwards said message to a first party connection point and a third party connection point.

6. The system of claim 5, wherein said first party connection point and said third party connection point forward said message to appropriate first party application programs and appropriate third party application programs.

7. The system of claim 4, wherein said object-oriented interface layer further comprises a management interface layer for permitting said at least one application program to open and close said at least one line device.

8. The system of claim 7, wherein said management interface further permits said at least one application program to register and unregister with said object-oriented interface layer.

9. The system of claim 4, wherein said object-oriented interface layer further comprises a distributed component object module for conforming said at least one application program to the specification of said telephony software interface.

10. A method for transmitting messages from at least one line device to a plurality of applications, said method comprising the steps of:

generating, by a line device, a message including model specific information in an application independent format for at least one application program;

receiving said message from at least one line device at an object-oriented interface layer;

forwarding said message to at least one of a first party connection point and a third party connection point;

forwarding said message to appropriate first party application programs when said message is forwarded to said first party connection point;

forwarding said message to appropriate third party application programs when said message is forwarded to said third party connection point; and performing an executable operation, configured using said model specific information, by a telephony software interface.

11. The method of claim 10, further comprising the steps of:

registering with said object-oriented interface layer as a first or third party application program by said at least one application program; and unregistering with said object-oriented interface layer as a first or third party application program by said at least one application program.

* * * * *